United States Patent [19]

Watts et al.

[11] 4,150,194

[45] Apr. 17, 1979

[54] LOW EMISSION PHENOLIC RESIN COMPOSITIONS

[75] Inventors: Fred G. Watts, Delaware; James T. Henderson, Columbus, both of Ohio

[73] Assignee: Ashland Oil, Inc., Ashland, Ky.

[21] Appl. No.: 925,492

[22] Filed: Jul. 17, 1978

Related U.S. Application Data

[63] Continuation of Ser. No. 856,897, Dec. 2, 1977, abandoned.

[51] Int. Cl.² ............................................. B32B 27/10
[52] U.S. Cl. .................................. 428/531; 528/129; 528/142
[58] Field of Search .......................................... 428/531

[56] References Cited

U.S. PATENT DOCUMENTS

| | | | |
|---|---|---|---|
| 2,035,515 | 3/1936 | Wilder | 526/71 |
| 2,293,805 | 8/1942 | Cooke et al. | 260/6 |
| 3,010,919 | 11/1961 | Mackinney et al. | 260/17.2 |
| 3,156,670 | 11/1964 | Soldatos | 528/151 |
| 3,661,814 | 5/1972 | Smith et al. | 260/17.2 |
| 3,705,146 | 12/1972 | Smith | 260/209 R |
| 3,725,349 | 4/1973 | Smith et al. | 260/17.2 X |
| 3,894,981 | 7/1975 | Kruglikov et al. | 260/38 X |

*Primary Examiner*—Howard E. Schain

[57] ABSTRACT

Phenol is condensed with a substantial excess of formaldehyde in the presence of a minor amount of a glycol or a polyalkylene glycol to provide a resole useful as an impregnating resinous binder for paper substrates.

6 Claims, No Drawings

LOW EMISSION PHENOLIC RESIN COMPOSITIONS

This is a continuation of Ser. No. 856,897, filed Dec. 2, 1977 and now abandoned.

BACKGROUND OF THE INVENTION

1. Field of the Invention

This invention relates to phenol-formaldehyde resinous compositions.

2. Description of the Prior Art

Phenol-formaldehyde condensates in the form of resoles are used extensively to impregnate paper substrates. Upon curing to a substantially insoluble and infusible stage, the resinous binder imparts structural strength and chemical resistance to the substrate for use in a variety of applications. A specific, but foremost application of the use of a phenolic resole in this manner is in the manufacture of filter media for both air and oil filtering systems in connection with the operation of on-and-off-the-road internal combustion engines.

The fabrication of filter structures of the foregoing type involve the following manufacturing operations. In the first or treating step, a continuous roll of paper is conventionally impregnated with a phenolic resole in the form of an alcohol solution of a condensate of phenol with formaldehyde. The saturated paper is heated through ovens or can driers to remove solvent. The treated paper is then corrugated for the purpose of increasing surface area. The corrugated sheet is subsequently conveyed through an oven in order to advance the cure of the resinous impregnate to a fusible intermediate or B stage, and then rolled again. B staging may be immediate to or time removed from the saturation step.

The rolls of the partially cured corrugated impregnated paper are provided in this manner to the filter manufacturer for completion of the manufacturing sequence. The latter initially involves appropriately pleating the paper and then heat-curing same to the final thermoset stage in order to achieve a sought degree of chemical, oil and moisture resistance for the filter medium. In the curing of resoles of the type referred to above in the preparation of paper filters, a copious amount of blue smoke is generated. This smoke is discharged into the atmosphere and because of its noxious nature poses an environmental problem. The current restrictions of the EPA in some states limit such discharge to those effluents which can pass the 80% light transmission test. Beyond meeting the foregoing requirement, it is desirable to reduce smoking because in so doing one is minimizing the loss of valuable phenol. Additionally, discharge effluents high in phenol derivatives content eventually form deposits on the blower fan, thereby impeding the efficiency thereof. Also, such deposits are prone to drip back into the oven and thus contaminate the paper undergoing curing.

The problem of smoking has to a large extent been obviated by substantially increasing the amount of formaldehyde employed in preparing the resole. This approach basically leads to the formation of phenol-formaldehyde polymers of higher average cross-linking density which are less apt to be emitted in the form of smoke under the conditions necessary for converting the phenolic condensate to a thermoset stage. However, the disadvantage of this approach is that the cured phenolic resin becomes too brittle for use in filter paper applications. Accordingly, the object of this invention is to provide a phenolic resole which will cure to a thermoset stage without any appreciable degree of smoking and yet the resultant cured product will retain sufficient flexibility for use in preparing paper filters.

SUMMARY OF THE INVENTION

In accordance with the present invention, modified phenol-formaldehyde resoles are provided which basically comprise a mixture of polymeric condensates of a cross-linking density, resulting from condensing a mole of a phenol with from 1.25–1.75 moles of formaldehyde to an appropriate end point. The indicated modification is effected by conducting the condensation reaction in the presence of a diol in the form of a glycol or polyalkylene glycol derived from either ethylene or propylene oxide. During the formation of the resole, a portion of the diol is structurally bound into the resinous chain thereby resulting in residues serving to enhance the flexibility properties of the thermoset products of said resole, whereas the unreacted diol remains as an external plasticizer.

DESCRIPTION OF THE PREFERRED EMBODIMENT

The preparation of a resole in accordance with this invention generally follows the reaction conditions normally observed for preparing conventional condensates of this type; viz., the use of a base catalysis and carrying out the condensation reaction under moderately elevated reaction temperature conditions. Accordingly, the reaction is preferably conducted under reflux at atmospheric pressure governed by the particular form of formaldehyde employed. In this connection, aqueous formaldehyde containing about 37 to 55% formaldehyde is the preferred form of this reactant. The methyl hemiacetal form of formaldehyde (Methyl Formcel) containing about 54% formaldehyde also represents an applicable source of said aldehyde. All of these solutions will result in a reflux temperature in the order of about 98°–110° C. There is nothing particularly critical in carrying out the reaction in this temperature range. Lower temperatures are applicable including the use of vacuum for refluxing purposes.

The phenol, which includes phenol itself or in combination with a substituted phenol, is reacted on a basis of one mole thereof with from 1.25–1.75 moles of the formaldehyde. More preferably, 1.4–1.6 moles of formaldehyde are employed per mole of the phenol. The optimum ratio of formaldehyde to phenol in contemplation of the utilitarian aspects of the invention as previously noted is about 1.5:1, respectively.

The present invention differs most importantly from the prior art method of preparing resoles in that a diol is present during the initial phase of this resinification process. Applicable diols are the glycols and polyalkylene glycols derived from either ethylene or propylene oxide. The preferred glycols include diethylene glycol, triethylene glycol, dipropylene glycol, tripropylene glycol and mixtures of these glycols. However, the higher polyethylene glycols having a molecular weight of from 200–1000 are suitable. The glycol is present in the amount of 10–40 wt. % based on the weight of the phenol present in the condensation mixture. More preferably, the diol is employed in the order of 20–25 wt. % based on the phenol.

As in the preparation of conventional resoles, the use of a basic catalyst is called for. Representative of the applicable catalysts are the hydroxides of the alkali metals. Sodium hydroxide is preferred for this purpose.

The amount of the indicated base catalysts ranges from about 0.5–1.5 wt. % based on the weight of the phenol. In using the preferred combining ratio of reactants as noted above together with the preferred operating conditions, the optimum amount of sodium hydroxide is in the order of 1%.

The condensation reaction is carried out until the resole is capable of curing to a thermoset condition in from 5–40 seconds in accordance with the Stroke cure test. This is a standard test procedure prevalently used in preparing phenolic resins in order to determine an end point of a cook. In accordance with the test, a one-half gram sample of the reaction mixture is spread upon the surface of a cure plate maintained at 150° C. to cover an area of approximately 1 in. × 3 ins. The time in seconds is then noted whereby the film sets up to a hard infusible stage. Upon obtaining an end point in the order noted, the reaction mixture is cooled to a temperature in the range of from about 40°–60° C. and vacuum dehydrated. The dehydration is carried out until the free water or moisture content is not in excess of about 5 wt. %. The Karl Fischer moisture determination method (ASTM Method E203) is the procedure conventionally used for this purpose. After the requisite degree of dehydration is realized, the dehydrated product is cut back with a polar solvent to provide a solution usually containing from 50–65% solids content. The lower alcohols represent the preferred solvents although ketones and the like can be used.

Further details regarding the preparation of the phenolic resins of this invention are given in the following working example which also serves to outline the best mode contemplated for carrying out the present invention. All parts and percentages noted therein are by weight unless otherwise indicated.

EXAMPLE I

Into a suitable resin reactor vessel equipped with the usual appurtenances were charged 100 parts of phenol, 20 parts of diethylene glycol, 92.5 parts of 50% aqueous formaldehyde and 2 parts of 50% caustic solution. With stirring, the charge was slowly heated to 230° F. and held at this temperature under brisk reflux conditions for about 2 hours. The cure time per the Stroke cure test was 28 seconds at this point. The reaction mixture was quickly cooled to 130°–140° F. and full vacuum applied to the reactor vessel. Dehydration was commenced and continued to 45 minutes, at which time the temperature had risen to 170° F. The vacuum was released and full cooling simultaneously applied and 75 parts of methyl alcohol were slowly added. Upon further cooling to 120° F., additional methyl alcohol was added to provide product containing 58% solids and exhibiting a Brookfield viscosity at 25° C. of 200 cps and a Stroke cure time of 20 seconds.

The above phenolic resin was evaluated as a filter paper impregnant noting the tendency to smoke during a simulated plant curing operation, as well as noting the relevant physical properties imparted to the filter paper both before and after curing the treated paper. The latter properties were determined in accordance with standardized test methods. For comparison purposes, a commercial filter paper phenolic resin (AROTAP 1176-Me-66 - ASHLAND CHEMICAL CO.) was included and referred to hereinbelow as exemplary of the prior art.

In conducting these tests, 8" × 11" size sheets of standard filter paper were impregnated with the respective resin solutions to provide about a 20% resin solids pick-up. Treating the impregnated paper in order to advance the resin component to a B stage was accomplished by first air drying for 15 minutes and then heating in a forced air oven at 250° F. for 5 minutes, resulting in reducing the volatile content to 6–7%. Final curing was obtained by heating the foregoing treated paper at 350° F. for 10 minutes. The smoke test was conducted by visually noting the density of the smoke emanating from a 1½" oven-attached pipe during curing. Ratings were made on the basis of an arbitrary scale of 0–10. The rating 10 indicates a dense, substantially opaque smoke. The rating 3 indicates that the smoke corresponds to about the density prescribed by current EPA regulations. The results of all tests are set forth in the following Table I.

TABLE I

| Test | Impregnation Phenolic Resins | | |
|---|---|---|---|
| | Invention | Prior Art | Base Paper |
| % Resins Solids | 20.0 | 19.3 | — |
| Smoke Rating (Initial) | 2–3 | 10 | — |
| Smoke Rating (1 weeks) | 1 | 10 | — |
| Uncured Properties: | | | |
| Mullen Burst Strength | 21 | 26 | 15 |
| Tensile Strength (MD) | 15 | 18 | 14 |
| Tensile Strength (CD) | 7 | 9 | 7 |
| Dry Stiffness (MD) | 1867 | 2134 | 1512 |
| Dry Stiffness (CD) | 800 | 1067 | 711 |
| Cured Properties: | | | |
| Mullen Burst Strength | 36.5 | 38 | — |
| Tensile Strength (MD) | 36 | 35 | — |
| Tensile Strength (CD) | 19 | 19 | — |
| Dry Stiffness (MD) | 4445 | 4356 | — |
| Dry Stiffness (CD) | 2045 | 2045 | — |

What is claimed is:

1. A thermosetting phenolic resin impregnated paper substrate wherein said phenolic resin is prepared by reacting aqueous formaldehyde or the methyl hemiacetal form thereof and a phenol in a molar ratio of from about (1.25–1.75):1.0, respectively, in the presence of a diol in the amount of from 10–40 wt. % based on said phenol and from about 0.5–1.5 wt. % based on said phenol of an alkali metal hydroxide, until the resultant condensate exhibits a cure time of from 5–40 seconds in accordance with the Stroke cure test, and thereupon dehydrating the reaction mixture to the extent whereby the water content is less than about 5 wt. %.

2. An impregnated paper substrate in accordance with claim 1 wherein the formaldehyde is reacted with phenol in a molar ratio of from (1.4–1.6):1.0, respectively.

3. An impregnated paper substrate in accordance with claim 2 wherein said diol is diethylene glycol, dipropylene glycol, triethylene glycol, tripropylene glycol or mixtures thereof.

4. An impregnated paper substrate in accordance with claim 3 wherein the molar ratio of formaldehyde to phenol is about 1.5:1, respectively.

5. An impregnated paper substrate in accordance with claim 4 wherein said glycol is present in the amount of from 20–25 wt. % based on the phenol.

6. An impregnated paper substrate in accordance with claim 5 wherein said glycol is diethylene glycol.

* * * * *